(12) United States Patent
Chun et al.

(10) Patent No.: US 6,200,122 B1
(45) Date of Patent: Mar. 13, 2001

(54) THERMOFORMING APPARATUS WITH IMPROVED PRESS

(75) Inventors: Victor L. Chun, Midland; Albert W. Arends; Andrew Richard, both of Gladwin, all of MI (US)

(73) Assignee: Brown Machine, LLC., Beaverton, MI (US)

( * ) Notice: Subject to any disclaimer, the term of this patent is extended or adjusted under 35 U.S.C. 154(b) by 0 days.

(21) Appl. No.: 09/366,255

(22) Filed: Aug. 3, 1999

(51) Int. Cl.[7] ................................................ B29C 51/00
(52) U.S. Cl. ..................... 425/136; 425/398; 425/408; 425/451.6; 100/286
(58) Field of Search ..................... 425/398, 408, 425/451.6, 592, 136, 150, 167; 100/286, 287, 46, 47, 48

(56) References Cited

U.S. PATENT DOCUMENTS

| | | | | |
|---|---|---|---|---|
| 4,088,432 | * | 5/1978 | Farrell | 425/451.6 |
| 4,377,377 | * | 3/1983 | Arends et al. | 425/155 |
| 5,002,479 | * | 3/1991 | Brown et al. | 425/398 |
| 5,814,185 | * | 9/1998 | Chun et al. | 156/580 |
| 5,925,162 | * | 7/1999 | Nitschke et al. | 65/361 |

* cited by examiner

Primary Examiner—Harold Pyon
Assistant Examiner—Donald Heckenberg
(74) Attorney, Agent, or Firm—John R. Benefiel

(57) ABSTRACT

A thermoformer apparatus having a press driving upper and lower platens by respective pairs of servo motors, each pair driving four toggle linkages to stabilize the platen against the forming pressures. Linear bearings are provided on four corner posts for precision guiding of the platen motion.

4 Claims, 4 Drawing Sheets

THERMOFORMING APPARATUS WITH IMPROVED PRESS

BACKGROUND OF THE INVENTION

This invention concerns thermoforming apparatus, and more particularly presses used in thermoforming parts from preheated plastic sheet material. Thermoforming is in widespread use as a manufacturing method, and involves preheating of thin plastic sheet material in an oven and then advancing the same into a thermoforming press having a mold located between the press platens.

The plastic sheet is drawn against the mold surfaces during the forming operation carried out by the application of a vacuum or air pressure causing the sheet material to be drawn against the mold surfaces. Relatively large articles are often manufactured this way and considerable press loads are generated by the fluid pressure forces acting over large areas, which must be resisted by the press platens and their supporting structure.

The forces required also may be increased by the use of plug assist tools in which complementary tooling is carried by one of the platens and driven into the forming surfaces on the other tooling piece. The weight of the tooling supported by the platens thus can become considerable. A large servo motor has sometimes been used, the size of the motor in turn resulting in a relatively slow response time of the platen drive mechanism. The relatively thin wall thickness of the part makes accuracy in the forming process more critical.

Presses used in thermoforming typically involve a pair of columns supporting the platens in their up and down motion and plain bearings are used in the linkages used to drive the platens up and down and to guide the platens on the machine frame. This construction has limitations in that the deflections of the platens under heavy loading is not sufficient to prevent inaccuracies in the thin walled parts formed due to slight tilting and bending of the platens and the structure supporting the platens under the heavy press loads described. In addition, a single large servo motor has considerable inertia increasing the cycle time required. This construction also absorbs a significant portion of the motor power to overcome the frictional losses. Where the apparatus is taxed to its utmost capability, these losses become critical, and the press may not be able to execute the operation required.

Accordingly, it is an object of the present invention to provide a thermoforming apparatus having an improved thermoforming press in which the stability and precision movement of the platens is substantially improved over the prior art thermoforming presses.

It is a further object of the present invention to provide a press for use in thermoforming operations in which the frictional losses are significantly reduced.

It is yet another object of the present invention to provide a servo motor operated platen mechanism in which the response capability of the servo motor drive is improved over the prior art designs for heavier duty presses.

SUMMARY OF THE INVENTION

These objects and others which will become apparent upon a reading of the following specification and claims are achieved by a thermoforming press in which the platens are guided on precision antifriction bearings located at each of four corners of each of upper and lower press platens, the bearings mounted on each of four posts forming a part of the press frame. Both the upper and lower platens are thereby guided on each of their four corners with minimal friction losses, highly precision guided movement of the platens is obtained, and the platen is very stably supported by the linear antifriction bearings at each corner post.

Actuation of each platen is carried out by a set of four separate linkages connected to each plate at a location adjacent the four corners of the plated, such as to evenly distribute the forces imposed on the platen by the press forces.

Two separate servo motors are provided for each platen drive, each servo motor driving a transmission having an output shaft having a pair of crank arms affixed thereto, in turn driving two of the four toggle linkages provided for each platen.

Both the upper and lower platen are mounted and driven in the same manner, such that a total of four servo motors driving two sets of four toggle linkages is employed for operation of the platens.

The pivotal connections of the links making up the toggle linkages are provided with antifriction bearings at the pivotal connections such as to further reduce the frictional losses in the system.

The dual servo motor drive for each platen provides a rapid response press operation. A very stable support of the platens, even under heavy loading is achieved, and an only minimal frictional losses are experienced such as to maximize the capacity of the press for conducting thermoforming operations.

BRIEF DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
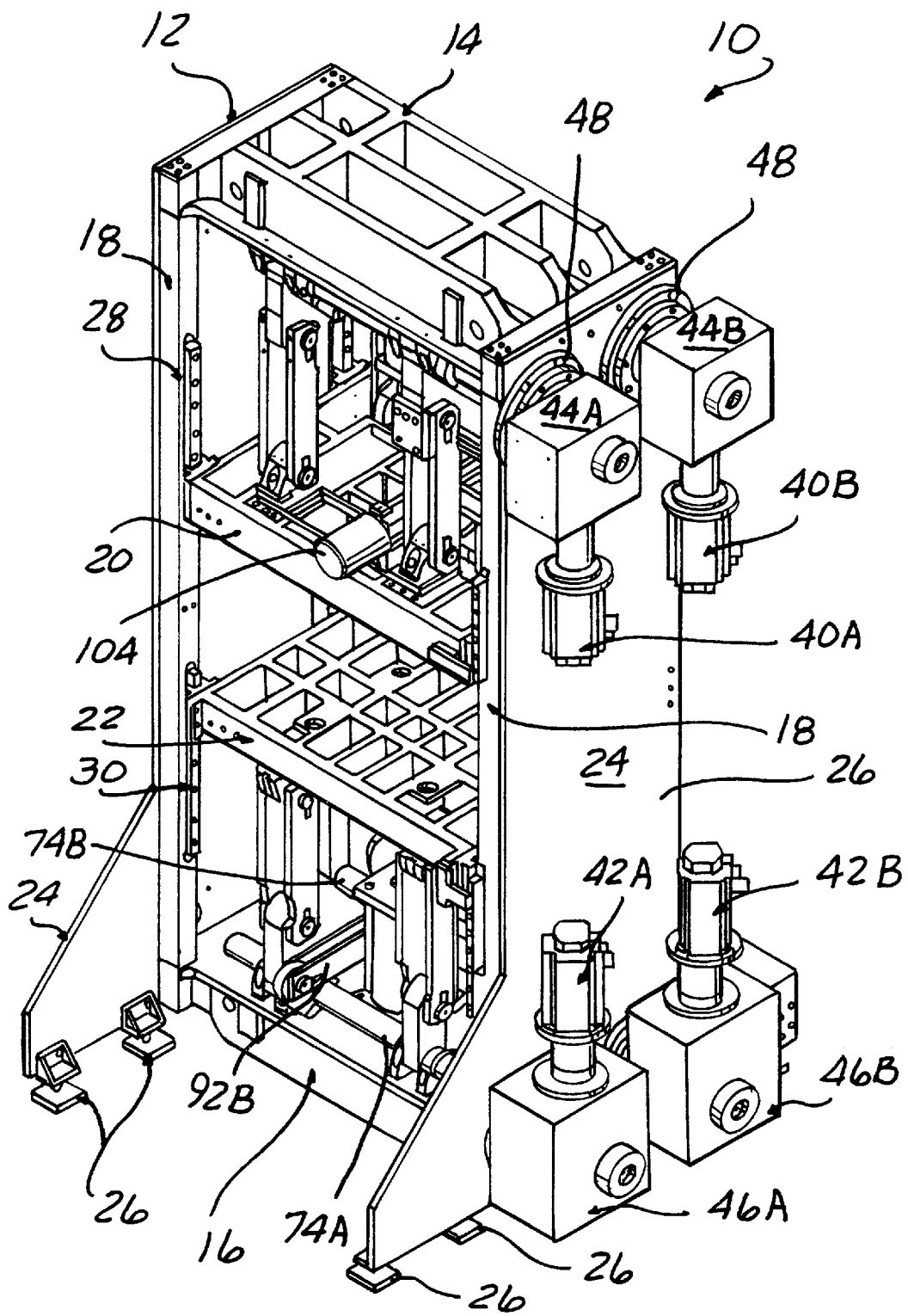
FIG. 1 is a perspective view of a thermoforming press according to the present invention.

Referring to FIG. 1, a press 10 according to the present invention includes a press frame 12 formed by a top 14 and a bottom 16 joined by four corner posts 18 defining a rectangular in section cavity within which an upper platen 20 and a lower platen 22 are mounted to be capable of vertical motion towards and away from each other.

A pair of side plates 24, 26 overlie the outer sides of each of the respective pairs of corner posts 18, secured with machine screws to the outer sides of the respective pairs of corner posts 18 to stiffen the frame and provide outriggers for antitip leveling feet 26 located to the front and rear of the press 10.

According to one aspect of the present invention, each corner of the upper and lower platens 20, 22 is supported by a precision linear antifriction bearing sets 28 and 30 each affixed to an inwardly facing surface of each frame post 18, with a suitable bearing slide affixed to each corner of the upper platen 20 and lower platen 22. This provides precision low friction guidance of each platen in its up and down motion within the frame 12. The platens 20, 22 may be temporarily held in position by means of a bracket 34 affixed thereto and a drilled plate 36 on one of the posts 18. The bottom platen 22 may also be held in position by means of a drilled plate 36 and bracket 38 such as to allow the platens 20, 22 to be held stationary for maintenance purposes.

According to the concept of the present invention, each of the upper and lower platens 20, 22 is driven by a drive arrangement comprised a pair of electric servo motors 40A and 40B for the upper platen and a pair of servo motors 42A, 42B for the lower platen 22.

Each servo motor 40A, 40B, 42A, 42B, drives a respective one of transmission units 44A, 44B, 46A, 46B. The motor-transmission assemblies thereby formed are each held on one of the side plates 24 by means of an adapter 48. An output shaft 50A, 50B extending from each of the transmissions 44A, 44B oscillates a main crank arm 52A, 52B, respectively, as well as auxiliary crank arms 54A, 54B.

A first connecting bar 56A drivingly connects auxiliary crank arms 54A, 54B together to oscillate insuring simultaneous oscillation of both of the output shafts 50A, 50B of the transmissions 44A, 44B. This stalls both motors 40A, 40B if one stalls to prevent one motor from continuing to operate if the other stalls.

The main crank arms 52A, 52B are each journaled to one end of one of a pair of doubled linkage members 58A, 58B. The pivoting thereon is preferably provided by low friction ball or roller bearings 60A, 60B, respectively, in order to reduce the frictional losses in the system.

The lower end of each double link 58A, 58B is journaled to a respective bearing block 62A, 62B again by means of low friction rotary bearings 64A, 64B. The bearing blocks 62A, 62B are secured to the top of the upper platen 20 by a shut height adjustment means to be described hereinafter. The transmission shafts 50A, 50B extend across the frontal width of the machine 10 and over a second pair of double links 66A, 66B. Main crank arms 68A, 68B are journaled to the upper end of the double length links 66A, 66B, while the lower end of the double links 66A, 66B are journaled in bearing blocks 70A, 70B fixed to the top of the upper platen 20.

A second connecting bar (not shown) is operated by a pair of auxiliary crank arms 72A, 72B also mounted to output shafts 50A, 50B.

Figure 2:
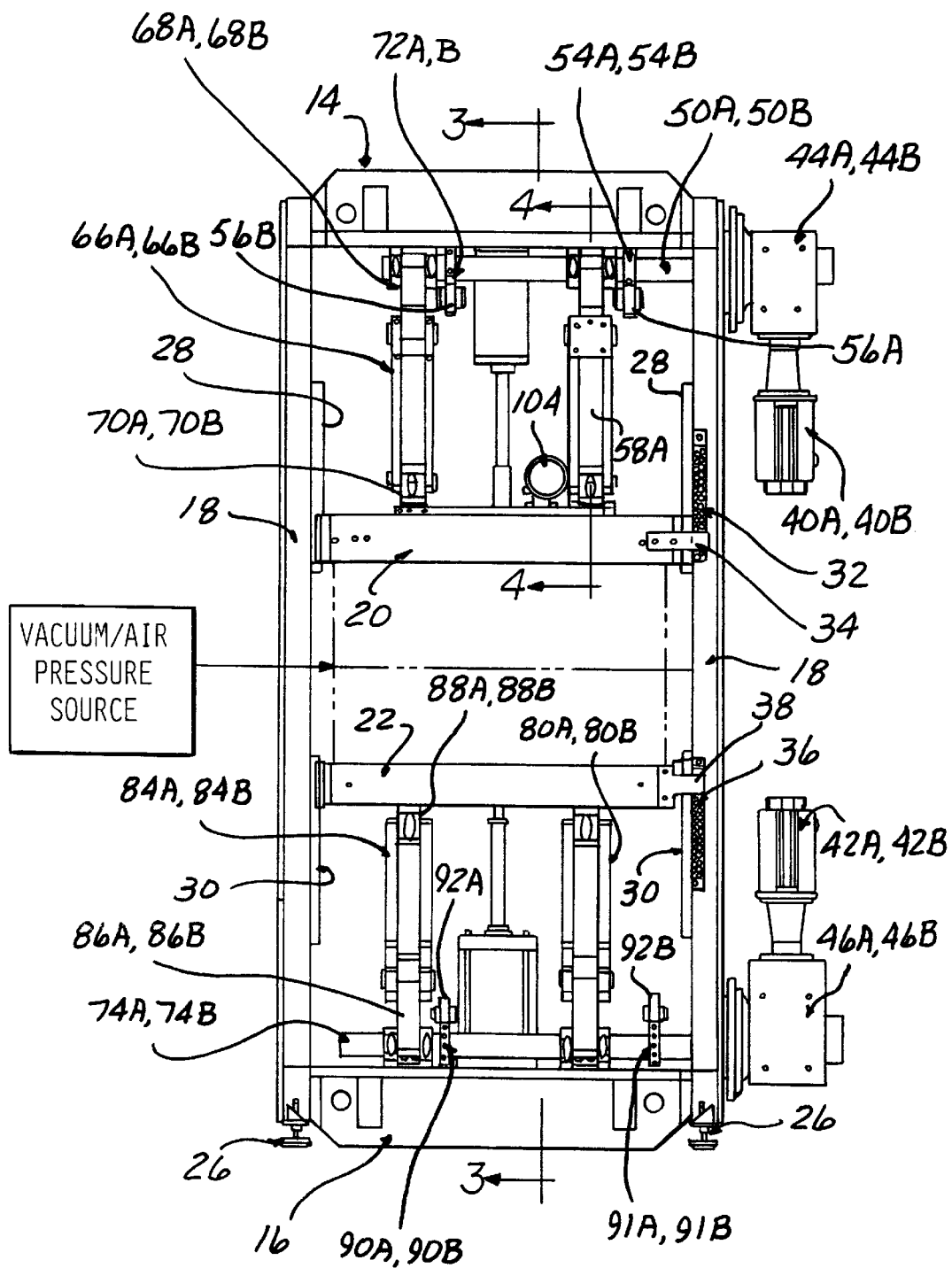
FIG. 2 is a front elevational view of the press thermoformer press shown in FIG. 1 with a block diagram representation of other components of the thermoformer apparatus.
Figure 3:
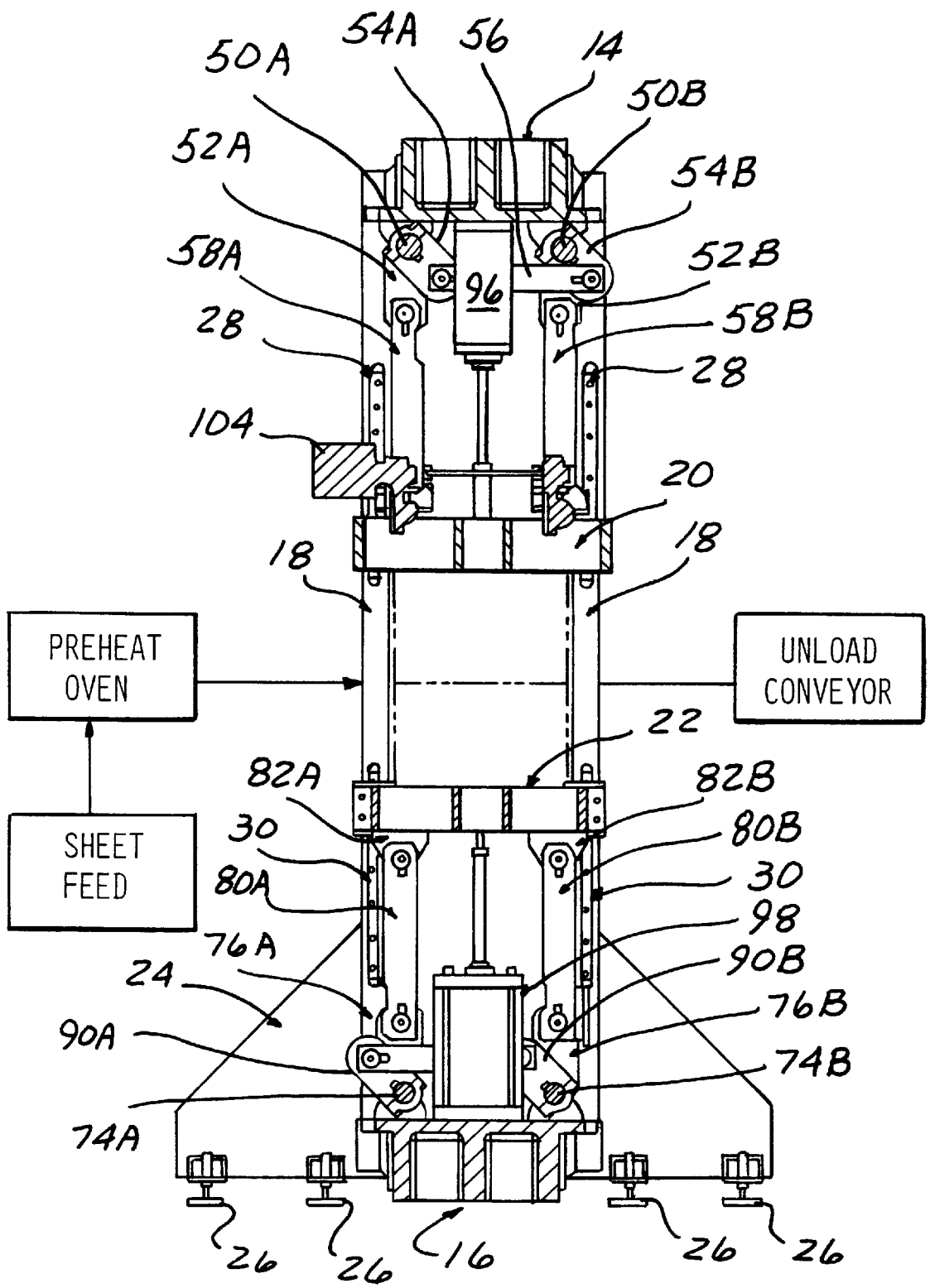
FIG. 3 is a side elevational view in partial section along the lines 3—3 in FIG. 2 with a block diagram representation of other components of the thermoformer apparatus.
Figure 4:
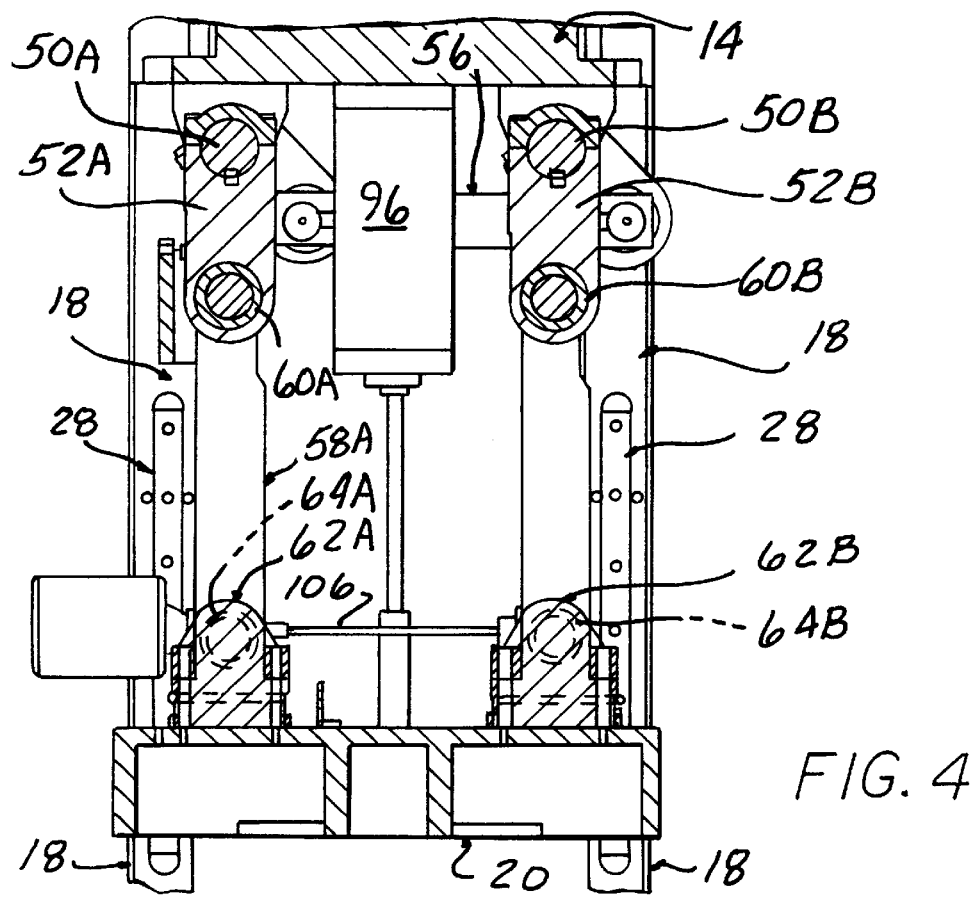
FIG. 4 is an enlarged view of the section 4—4 taken in FIG. 2.
Figure 5:
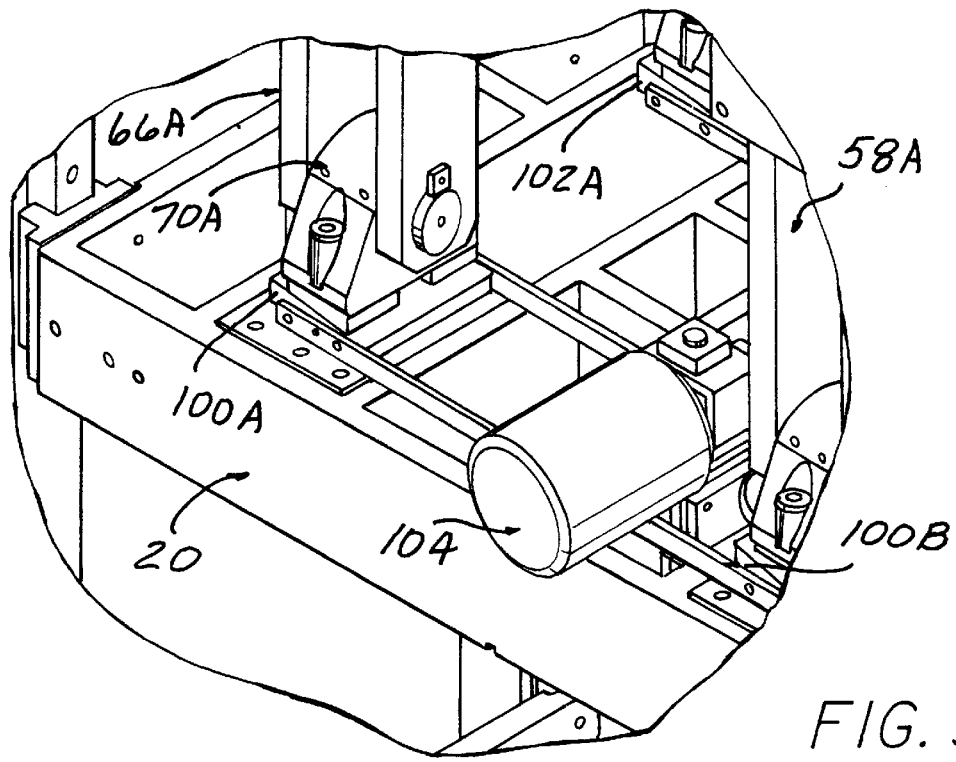
FIG. 5 is an enlarged fragmentary view of a portion of the thermoformer press shown in FIG. 1 showing details of the shut height adjustment mechanism.

Lower transmissions 46A, 46B likewise have respective output shafts 74A, 74B which each drive a main crank arm 76A, 76B which are each pivotally connected to the lower end of a double links 80A, 80B on the right hand side of the machine as viewed in FIG. 2, with the upper end of each of the double links 80A, 80B pivotally mounted in bearing blocks 82A, 82B fixed to the undersurface of the lower platen 22.

A second pair of double links 84A, 84B are also driven by the shafts 74A, 74B by means of main crank arms 86A, 86B pivotally connected thereto with the upper ends of the linkages 84A, 84B, likewise journaled in bearing blocks 88A, 88B affixed to the undersurface of the lower platen 22. Auxiliary cranks 90A, 90B, 91A, 91B are provided, driven by the shafts 74A, 74B, respectively, to drive connecting bars 92A, 92B for the purpose described above.

The transmission output shafts 50A, 50B, 74A, 74B are each oscillated by the connected servo motor, to produce a dead center condition shown in the drawings at one extreme position, which is the bottom dead center position of the toggle linkage formed by the main crank arms and double linkage, a full stroke of the platens 20, 22. Return oscillation of the crank arms, 52A, 52B, 76A, 76B draws each of the upper platen 20 and lower platen 22 apart from each other.

The combination of the crank arm 62A and the double links 58A, 58B, 64A, 64B, 66A, 66B, 86A, 86B and links 84A, 84B act as toggle linkages able to exert a powerful mechanical advantage. In the aligned, dead center position shown, the platens 20, 22 are able to be held in position against the enormous thermoforming pressures typically exerted. The four point location of the four links mounted to each platen with a double link adjacent each corner of a platen, together with the location of the precision bearings 28, 30, provide a very precise guided platen movement, and stabilized support for the platens 20, 22 despite the heavy forces imposed, such that very good accuracy of the thermoformed parts may be achieved.

An auxiliary lifting cylinder 96 for the upper platen and auxiliary lifting cylinder 78 for the lower platen is provided to assist in overcoming the weight of the tooling dies, shown diagrammatically in phantom lines in the drawings. Such assist cylinders are well known and typically comprise pneumatically actuated devices.

The press shut height may be adjusted by means of slide wedges 100A, 100B, 102A, 102B interposed beneath the bearing blocks 62A, 62B, 70A, 70B.

An adjustment motor 104 is operatively connected to cause sliding movement of the wedges 100A, 100B and via a cross shaft 106, also the wedges 102A, 102B by means of a power screw device of a type well known in the art and hence will not described herein in detail.

What is claimed is:

1. A thermoforming apparatus including a press, a preheat oven preheating plastic sheet material to be formed into shaped articles in said press, means for feeding sheet material through said oven and into said press, means for creating a differential pressure acting on said sheet material to force said sheet material against tooling in said press to be formed, said press including;

a machine frame;

an upper platen;

a lower platen;

said machine frame including a top structure and a bottom structure connected together by four corner posts extending therebetween, said upper and lower platens confined within said corner posts for movement towards and away from each other to bring thermoforming tooling together to form an article and to separate said thermoforming tooling to allow loading of sheet material into said tooling and to remove a formed article:

said upper and lower platen each guided by linear bearing means on an inside surface of each of said four corner posts and outside surfaces of sides of said upper and lower platens to guide movement thereon during said platen movement towards and away from each other;

an upper platen drive means including a set of four toggle linkages drivingly connected to an upper side of said upper platen in a rectangular pattern to establish four points of support for said upper platen to resist forces generated by thermoforming of said articles;

said upper platen drive means further including motor means driving said set of linkages drivingly connected to said upper platen to cause movement of said upper platen towards and from said lower platen;

lower platen drive means including a set of four toggle linkages drivingly connected to a lower side of said lower platen in a rectangular pattern to establish four points of support for said lower platen to resist forces generated by thermoforming of said articles;

said lower platen drive means further including lower platen motor means driving said set of four toggle linkages connected to said lower platen to cause said movement of said lower platen toward, and away from said upper platen;

said upper platen motor means including two separate servo drive motors each having an output shaft drivingly connected to respective pairs of said four linkages connected to said upper platen, and said lower platen motor means including two separate servo motors each having an output shaft drivingly connected to respective pairs of said four linkages connected to said lower platen; and further including a positive driving interconnection between said output shafts of said two servo motors of each of said upper and lower platen drive means positively constraining simultaneous rotation of said output shafts of said upper platen and lower platen drive means, whereby if one servo motor stalls, the other servo motor in said respective upper or lower platen drive is stopped.

2. The thermoforming apparatus according to claim 1 wherein each servo motor of said upper and lower platen drive means includes output shafts extending across the respective upper and lower platens, wherein each set of said four toggle linkages includes a pair of spaced apart crank arms connected to each output shaft, a separate link with each crank arm of said two servo motors and a pivotal connection between each crank arm and one end of said link, an opposite end of each of said four links in each set of toggle linkages pivotally mounted to said upper and lower platen, respectively, oscillation of said output shafts driven by respective servo motors causing oscillation of said links to cause movement of said upper and lower platens, said crank arms each becoming aligned with a respective link in a fully extended position in which said upper and lower platens are drawn closest together.

3. The thermoforming apparatus according to claim 2 wherein each pivotal connection of each of said links includes an antifriction bearing.

4. The thermoforming apparatus according to claim 2 wherein each servo motor and the output shaft are interconnected by a transmission unit.

* * * * *